US012785759B2

(12) United States Patent
Elshafie et al.

(10) Patent No.: US 12,785,759 B2
(45) Date of Patent: Nov. 3, 2026

(54) TECHNIQUES FOR CONFIGURING RECONFIGURABLE INTELLIGENT SURFACES SERVING FULL-DUPLEX NODES

(71) Applicant: QUALCOMM Incorporated, San Diego, CA (US)

(72) Inventors: Ahmed Elshafie, San Diego, CA (US); Yu Zhang, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 405 days.

(21) Appl. No.: 18/280,091

(22) PCT Filed: May 11, 2021

(86) PCT No.: PCT/CN2021/093074

§ 371 (c)(1),
(2) Date: Sep. 1, 2023

(87) PCT Pub. No.: WO2022/236684

PCT Pub. Date: Nov. 17, 2022

(65) Prior Publication Data

US 2024/0154647 A1 May 9, 2024

(51) Int. Cl.

*H04B 7/04* (2017.01)
*H04B 7/0408* (2017.01)
*H04L 5/14* (2006.01)

(52) U.S. Cl.

CPC ....... *H04B 7/04013* (2023.05); *H04B 7/0408* (2013.01); *H04L 5/14* (2013.01)

(58) Field of Classification Search

CPC ......................... H04B 7/04013; H04B 7/0408; H04B 7/0617; H04B 7/145; H04L 5/14; H04L 25/0224

See application file for complete search history.

(56) References Cited

U.S. PATENT DOCUMENTS

| | | | | |
|---|---|---|---|---|
| 2020/0028563 | A1* | 1/2020 | Gao | H04L 5/0051 |
| 2021/0135728 | A1 | 5/2021 | Raghavan et al. | |
| 2021/0160861 | A1* | 5/2021 | You | H04W 56/0015 |

(Continued)

FOREIGN PATENT DOCUMENTS

| | | | | |
|---|---|---|---|---|
| CN | 111245492 | A | 6/2020 | |
| WO | WO-2020235326 | A1 * | 11/2020 | H04W 72/23 |

OTHER PUBLICATIONS

U.S. Appl. No. 63/123,211, filed Dec. 9, 2020 (Year: 2020).*

(Continued)

*Primary Examiner* — Sun Jong Kim
(74) *Attorney, Agent, or Firm* — ArentFox Schiff LLP

(57) ABSTRACT

Techniques for configuring reconfigurable intelligent surfaces serving full-duplex nodes are provided. In an example, a first network node such as a base station or a user equipment (UE) may determine to communicate with a second network node (e.g., UE or base station) via a reconfigurable intelligent surface (RIS) system using full-duplex communications. The first network node may transmit, to an RIS controller of the RIS system, an indication that the first network node will communicate with the second network node using the full-duplex communications.

15 Claims, 11 Drawing Sheets

(56) References Cited

U.S. PATENT DOCUMENTS

| | | | | |
|---|---|---|---|---|
| 2021/0409177 | A1* | 12/2021 | Hao | H04W 72/541 |
| 2022/0014935 | A1* | 1/2022 | Haija | H04W 16/28 |
| 2022/0232481 | A1* | 7/2022 | Kusashima | H04W 72/0446 |
| 2022/0400478 | A1* | 12/2022 | Du | H04B 7/026 |
| 2024/0014860 | A1* | 1/2024 | Wang | H04B 7/024 |

OTHER PUBLICATIONS

International Search Report and Written Opinion—PCT/CN2021/093074—ISA/EPO—Nov. 5, 2021.

Tekbiyik K., et al., "Channel Estimation for Full-Duplex RIS-Assisted HAPS Backhauling with Graph Attention Networks,", arxiv .org, Cornell University Library, 201 OLIN Library Cornell University Ithaca, NY 14853, Oct. 22, 2020 (Oct. 22, 2020), XP081795884, 6 pages, the whole document.

* cited by examiner

TECHNIQUES FOR CONFIGURING RECONFIGURABLE INTELLIGENT SURFACES SERVING FULL-DUPLEX NODES

CROSS-REFERENCE TO RELATED APPLICATIONS

This is a national stage application filed under 37 U.S.C. 371 of International Patent Application No. PCT/CN2021/093074, filed May 11, 2021, titled "TECHNIQUES FOR CONFIGURING RECONFIGURABLE INTELLIGENT SURFACES SERVING FULL-DUPLEX NODES", the disclosure of which is incorporated herein by reference in its entirety.

TECHNICAL FIELD

Aspects of the present disclosure relate generally to wireless communications, and more particularly, to techniques for configuring reconfigurable intelligent surfaces (RISs) servicing full-duplex nodes.

BACKGROUND

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

SUMMARY

Systems, methods, and apparatus presented herein each have several innovative aspects, no single one of which is solely responsible for the desirable attributes disclosed herein. The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of wireless communication for a first network node is provided. The method may include determining to communicate with a second network node via an RIS system using full-duplex communications. The method may include transmitting, to an RIS controller of the RIS system, an indication that the first network node will communicate with the second network node using the full-duplex communications.

In another aspect, a first network node including a memory storing instructions and one or more processors coupled with the memory, is provided. The first network node may be configured to determine to communicate with a second network node via an RIS system using full-duplex communications. The first network node may be configured to transmit, to an RIS controller of the RIS system, an indication that the first network node will communicate with the second network node using the full-duplex communications.

In another aspect, a method of wireless communication for an RIS system, is provided. The method may include receiving, from a first network node, an indication that the first network node will communicate with a second network node using full-duplex communications. The method may include configuring weights of an RIS surface of the RIS system in response to the indication. The method may include reflecting the full-duplex communications between the first network node and the second network node in response to the weights being configured.

In another aspect, an example RIS system including a memory storing instructions and one or more processors coupled with the memory, is provided. The RIS system may be configured to receive, from a first network node, an indication that the first network node will communicate with a second network node using full-duplex communications. The RIS system may be configured to configure weights of an RIS surface of the RIS system in response to the indication. The RIS system may be configured to reflect the full-duplex communications between the first network node and the second network node in response to the weights being configured.

In other aspects, apparatuses and computer-readable mediums for performing the above-disclosed methods are provided.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
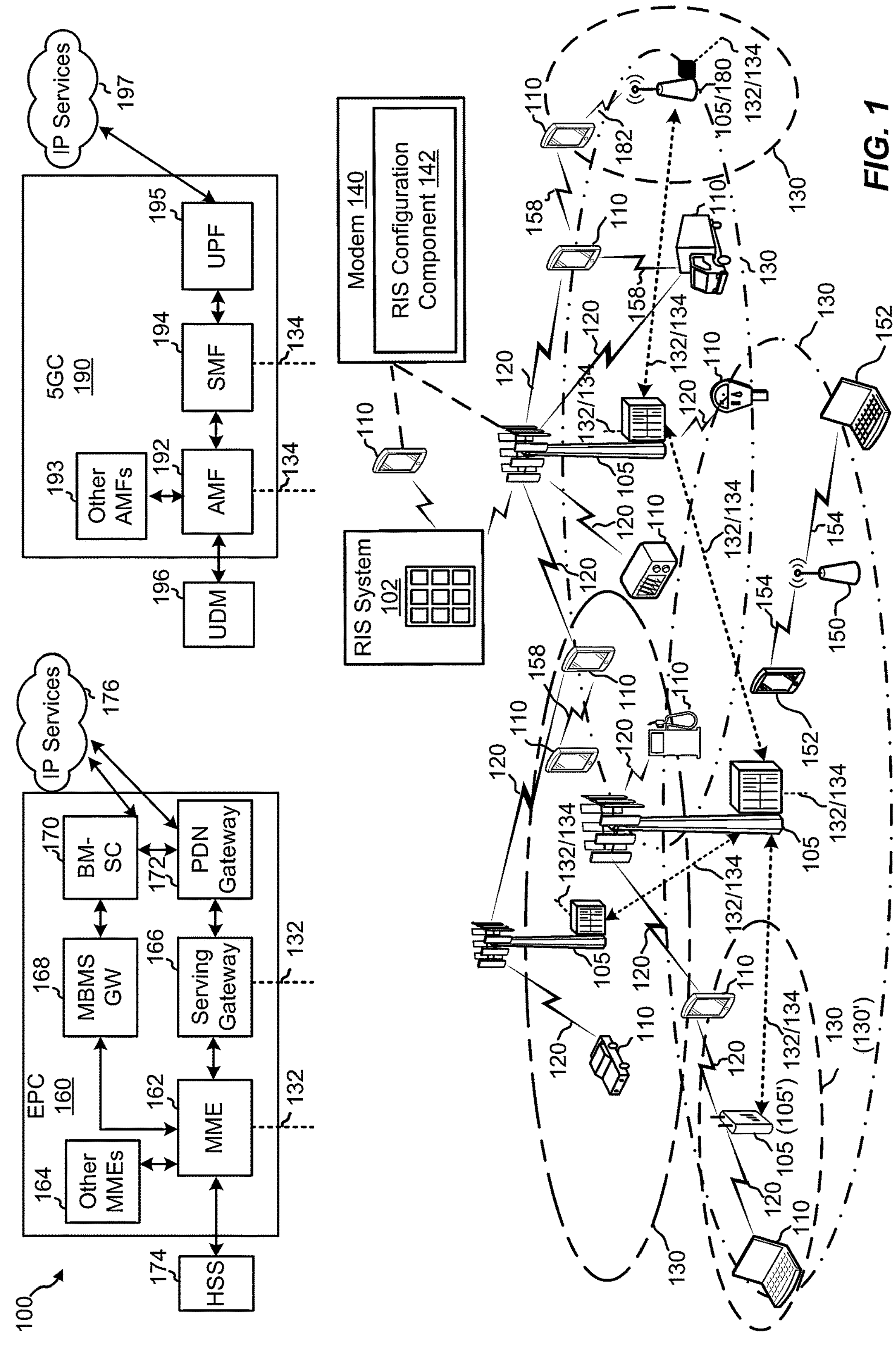
FIG. 1 is a diagram illustrating an example of a wireless communications system and an access network, according to aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A reconfigurable intelligent surface (RIS) device (a.k.a. reflective intelligent surface, software-controlled metasurface, or intelligent reflecting surface) receives a signal (e.g., beam or waveform) from a first network node (e.g., base station or user equipment (UE)) and reflects the signal to a second network device (e.g., base station or UE) by changing one or more of a phase, an amplitude, or a weight of the signal to direct the signal to the second network device. However, conventionally, the RIS system is unable to provide full duplex communications between the first network node and the second network node.

Aspects of the present disclosure provide techniques for an RIS system to serve full-duplex nodes. In an example, a base station or UE may configure an RIS system for full-duplex operation by sending an indication of the full-duplex operation and/or an indication of whether the full-duplex operation is an inband or subband operation. In another example, a base station or UE may configure an RIS system to change an uplink (UL) beam and a downlink (DL) beam jointly or separately. Further, once beam training is performed, jointly or separately, is complete, the base station or UE may refine beams under full-duplex operation by training a DL beam based on a UL beam (or vice versa), and training a beam (UL or DL) based on the updated beam (DL or UL). In another example, a base station or UE may request a self-channel estimation to allow a known reflection matrix to be used by the RIS system for performing training.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

Turning now to the figures, examples of systems, apparatus, and methods according to aspects of the present disclosure are depicted. It is to be understood that aspects of the figures may not be drawn to scale and are instead drawn for illustrative purposes.

FIG. 1 is a diagram illustrating an example of a wireless communications system and an access network 100. The wireless communications system (also referred to as a wireless wide area network (WWAN)) includes at least one base station 105, at least one UE 110, at least one Evolved Packet Core (EPC) 160, and at least one 5G Core (5GC) 190. The base station 105 may include macro cells (high power cellular base station) and/or small cells (low power cellular base station). The macro cells include base stations. The small cells include femtocells, picocells, and microcells.

In an example, a base station 105 or UE 110 (e.g., first network node 200 or FIG. 2) may include a modem 140 and/or a RIS configuration component 142 for configuring an RIS system 102 for full-duplex communications. In another example, In another example, a RIS controller 310 of FIG. 3 may be configured to configure a RIS panel 320 of FIG. 3 for full-duplex communications.

A base station 105 may be configured for 4G LTE (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A base station 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the base station 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base station 105 may communicate directly or indirectly (e.g., through the EPC 160 or 5GC 190) with each other over the backhaul links interfaces 134. The backhaul links 132, 134 may be wired or wireless.

The base station 105 may wirelessly communicate with the UEs 110. Each of the base station 105 may provide communication coverage for a respective geographic coverage area 130. There may be overlapping geographic coverage areas 130. For example, the small cell 105' may have a coverage area 130' that overlaps the coverage area 130 of one or more macro base station 105. A network that includes both small cell and macro cells may be known as a heterogeneous network. A heterogeneous network may also include Home Evolved Node base station (eNBs) (HeNBs), which may provide service to a restricted group known as a closed subscriber group (CSG). The communication links 120 between the base station 105 and the UEs 110 may include uplink (UL) (also referred to as reverse link) transmissions from a UE 110 to a base station 105 and/or downlink (DL) (also referred to as forward link) transmissions from a base station 105 to a UE 110. The communication links 120 may use multiple-input and multiple-output (MIMO) antenna technology, including spatial multiplexing, beamforming, and/or transmit diversity. The communication links may be through one or more carriers. The base station 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more SL channels, such as a physical SL broadcast channel (PSBCH), a physical SL discovery channel (PSDCH), a physical SL shared channel (PSSCH), and a physical SL control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A base station 105, whether a small cell 105' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 110. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base station 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a repeater, a transceiver function, a basic service set (BSS), an extended service set (ESS), a transmit reception point (TRP), or some other suitable terminology. The base station 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as internet-of-things (IoT) devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
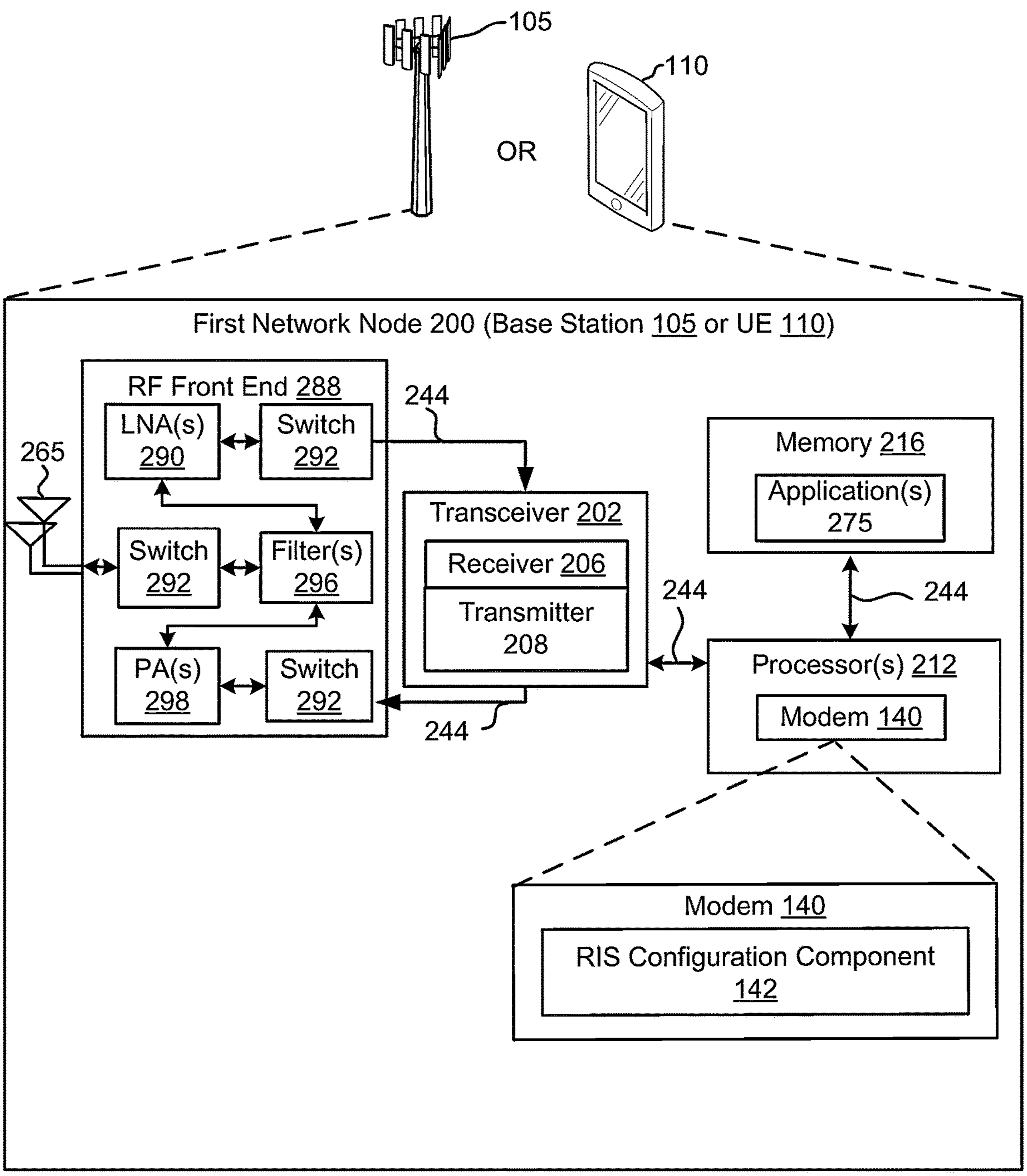
FIG. 2 is a schematic diagram of an example of a first network node (e.g., base station or user equipment (UE)) of FIG. 1, according to aspects of the present disclosure.

Referring to FIG. 2, an example implementation of a first network node 200 (e.g., base station 105 or UE 110) may include the modem 140 having the RIS configuration component 142. The modem 140 and/or the RIS configuration component 142 of the first network node 200 may be configured to configure an RIS system 102, as described in further detail herein.

In some implementations, the first network node 200 may include a variety of components, including components such as one or more processors 212 and memory 216 and transceiver 202 in communication via one or more buses 244, which may operate in conjunction with the modem 140 and/or the RIS configuration component 142 to enable one or more of the functions, described herein. Further, the one or more processors 212, modem 140, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 140 that uses one or more modem processors. The various functions related to the RIS configuration component 142 may be included in the modem 140 and/or the processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 140 may configure the first network node 200 along with the processors 212. In other aspects, some of the features of the one or more processors 212 and/or the modem 140 associated with the RIS configuration component 142 may be performed by the transceiver 202.

Also, the memory 216 may be configured to store data used herein and/or local versions of applications 275 or the RIS configuration component 142 and/or one or more subcomponents of the RIS configuration component 142 being executed by at least one processor 212. The memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, the memory 216 may be a non-transitory computer-readable storage medium that stores one or more computer-executable codes defining the RIS configuration component 142 and/or one or more of its subcomponents, and/or data associated therewith, when the first network node 200 is operating at least one processor 212 to execute the RIS configuration component 142 and/or one or more of the subcomponents.

The transceiver 202 may include at least one receiver 206 and at least one transmitter 208. The receiver 206 may include hardware, firmware, and/or software code executable by a processor for receiving data, the code comprising instructions and being stored in a memory (e.g., computer-readable medium). The receiver 206 may be, for example, an RF receiving device. In an aspect, the receiver 206 may receive signals transmitted by at least one other network device (e.g., base station 105 or UE 110). The transmitter 208 may include hardware, firmware, and/or software code executable by a processor for transmitting data, the code comprising instructions and being stored in a memory (e.g., computer-readable medium). A suitable example of the transmitter 208 may include, but is not limited to, an RF transmitter.

Moreover, in an aspect, the first network node 200 may include the RF front end 288, which may operate in communication with one or more antennas 265 and the transceiver 202 for receiving and transmitting radio transmissions, for example, wireless communications transmitted by at least one other network device. The RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, the LNA 290 may amplify a received signal at a desired output level. In an aspect, each of the LNAs 290 may have a specified minimum and maximum gain values. In an aspect, the RF front end 288 may use one or more switches 292 to select a particular LNA 290 and the specified gain value based on a desired gain value for a particular application.

Further, for example, one or more PA(s) 298 may be used by the RF front end 288 to amplify a signal for an RF output at a desired output power level. In an aspect, each of the PAs 298 may have specified minimum and maximum gain values. In an aspect, the RF front end 288 may use one or more switches 292 to select a particular PA 298 and the specified gain value based on a desired gain value for a particular application.

Also, for example, one or more filters 296 may be used by the RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, the RF front end 288 may use one or more switches 292 to select a transmit or receive path using a specified filter 296, the LNA 290, and/or the PA 298, based on a configuration as specified by the transceiver 202 and/or processor 212.

As such, the transceiver 202 may be configured to transmit and receive wireless signals through one or more antennas 265 via the RF front end 288. In an aspect, the transceiver 202 may be tuned to operate at specified frequencies such that the first network node 200 may communicate with, for example, one or more of the UEs 110, one or more of the base stations 105, or one or more cells associated with one or more of the base stations 105. In an aspect, for example, the modem 140 may configure the transceiver 202 to operate at a specified frequency and power level based on a control entity configuration of the first network node 200 and the communication protocol used by the modem 140.

In an aspect, the modem 140 may be a multiband-multimode modem, which may process digital data and communicate with the transceiver 202 such that the digital data is sent and received using the transceiver 202. In an aspect, the modem 140 may be multiband and be configured to support multiple frequency bands for a specific communications protocol. In an aspect, the modem 140 may be multimode and be configured to support multiple operating networks and communications protocols. In an aspect, the modem 140 may control one or more components of the first network node 200 (e.g., RF front end 288, transceiver 202) to enable transmission and/or reception of signals from the network based on a specified modem configuration. In an aspect, a modem configuration may be based on the mode of the modem 140 and the frequency band in use. In another aspect, the modem configuration may be based on control entity configuration information associated with the first network node 200 as provided by the network (e.g., base station 105).

Figure 3:
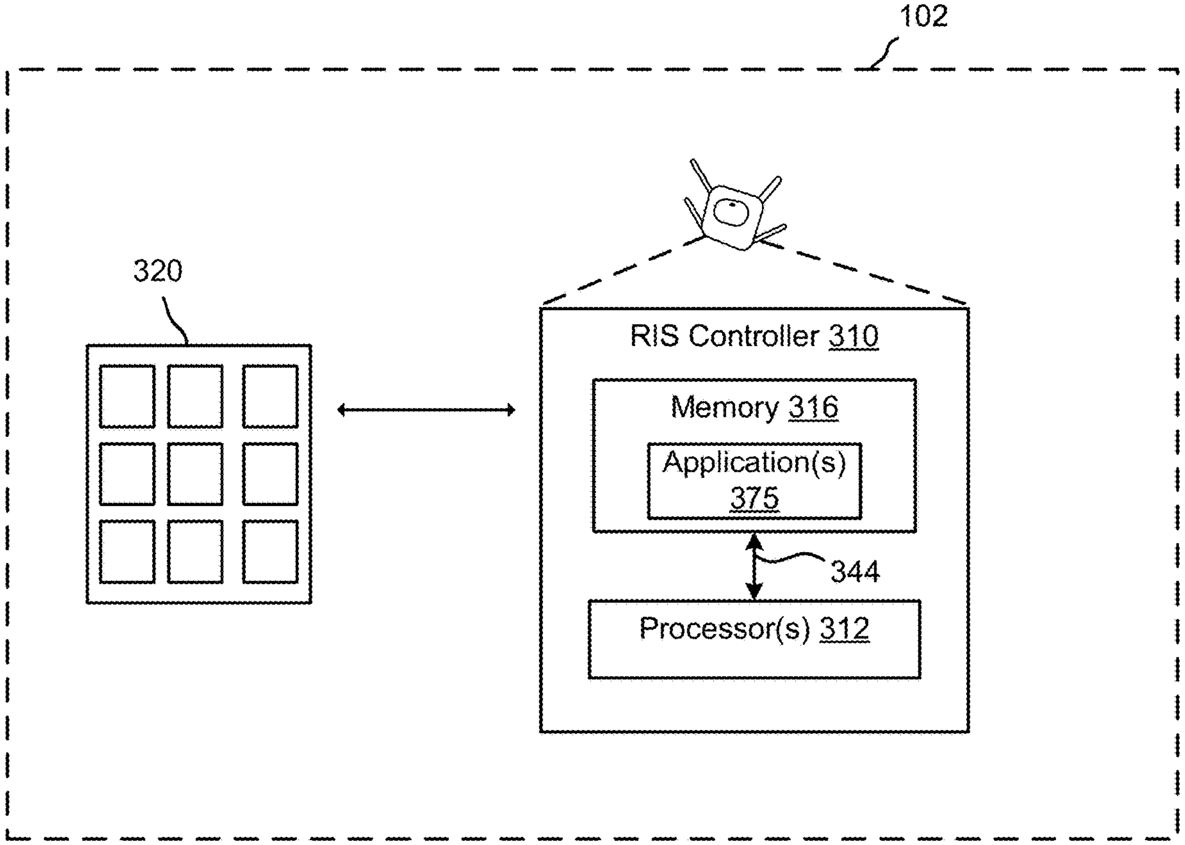
FIG. 3 is a schematic diagram of an example of a reconfigurable intelligent surface (RIS) system of FIG. 1, according to aspects of the present disclosure.

Referring to FIG. 3, an example implementation of an RIS system 102 may include an RIS controller 310 configured to communicate with an RIS surface 320.

In some implementations, the RIS controller 310 may include a variety of components, including components such as one or more processors 312 and memory 316 in communication via one or more buses 344, which may enable one or more of the functions, described herein. In an aspect, the one or more processors 312 may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor.

Also, the memory 316 may be configured to store data used herein and/or local versions of applications 375, and/or one or more subcomponents executed by at least one processor 312. The memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, the memory 316 may be a non-transitory computer-readable storage medium that stores one or more computer-executable codes defining one or more of the subcomponents, and/or data associated therewith, when the RIS controller 310 is operating at least one processor 312 to execute one or more of the subcomponents.

In 5G technologies, massive multiple-input-multiple-output (MIMO) systems may be a key enabler for increasing throughput in a network. Use of MIMO systems may achieve high beamforming gain by using active antenna units (AAUs), implement individual radio frequency (RF) chains per antenna ports, and/or significant increase power consumption due to the use of AAUs.

Figure 4:
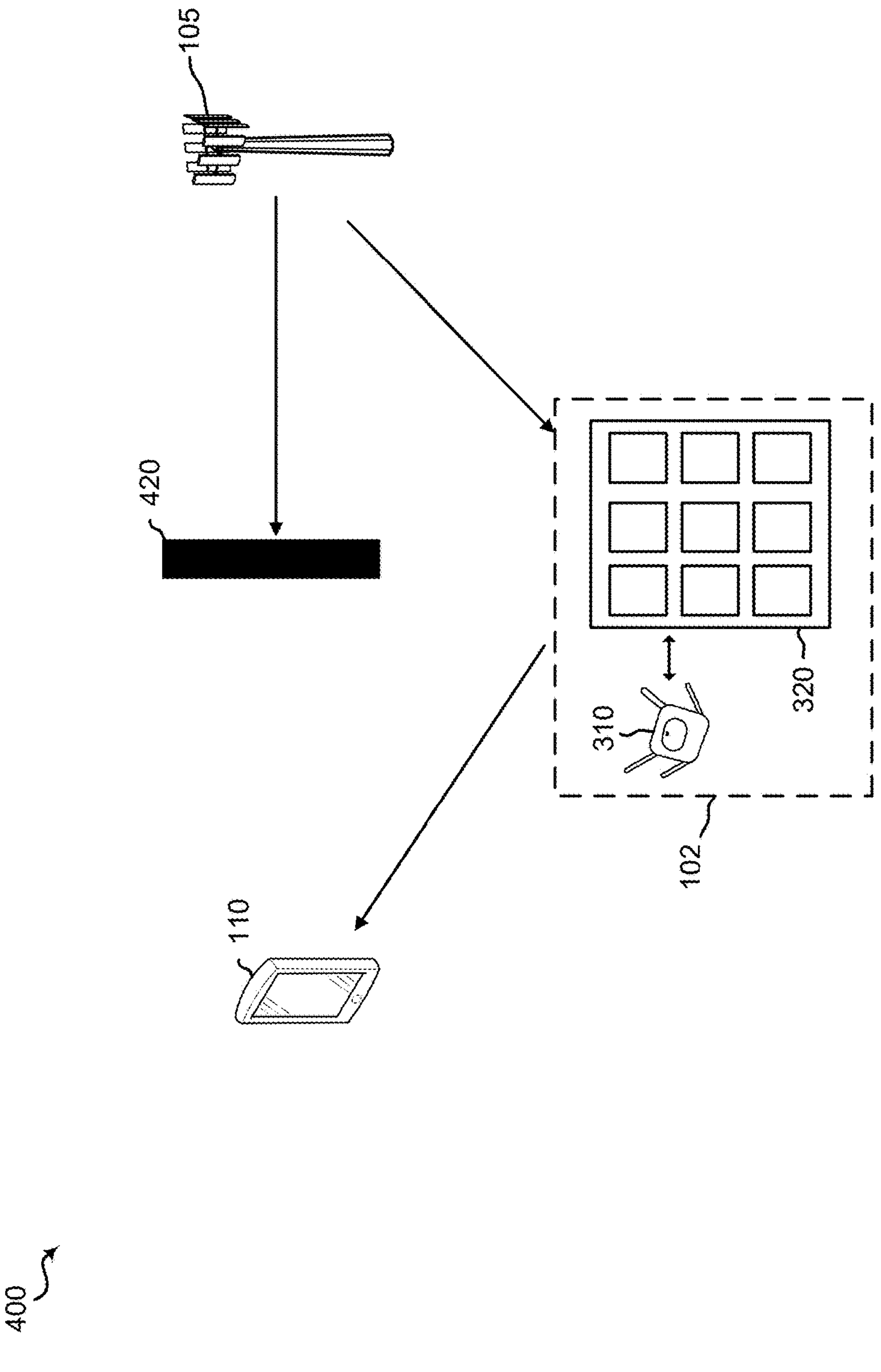
FIG. 4 is a block diagram of an example of wireless communications between the UE and base station via a RIS system, according to aspects of the present disclosure.

Referring to FIG. 4, the RIS system 102 may be employed to extend 5G coverage areas with negligible power consumption. In an example, the RIS system 102 may be a near passive device, may reflect an impinging wave to a desired direction, and/or may have a reflection direction controlled by the base station 105 or the UE 110. For example, the RIS system 102 may change one or more of a phase, an amplitude, or a weight of the signal to direct the signal to a selected device (e.g., UE 110) or group of devices. The RIS controller 310 may control the RIS surface 320 to reflect a signal from the, for example, the base station 105 to the UE 110 (or vice versa), as illustrated by FIG. 4. For example, if a blockage 420 prevents the base station 110 from directly sending a signal to the UE 110, the RIS system 102 may provide another path for the base station 105 and the UE 110 to communicate. In an example, the RIS surface 320 may include K different indices, where each index is a matrix of size N×M (N rows and M columns), where N and M may be any positive integer. In contrast to a relay device, the RIS system 102 does not buffer or increase power of the signal but instead reflects the signal.

Figure 5:
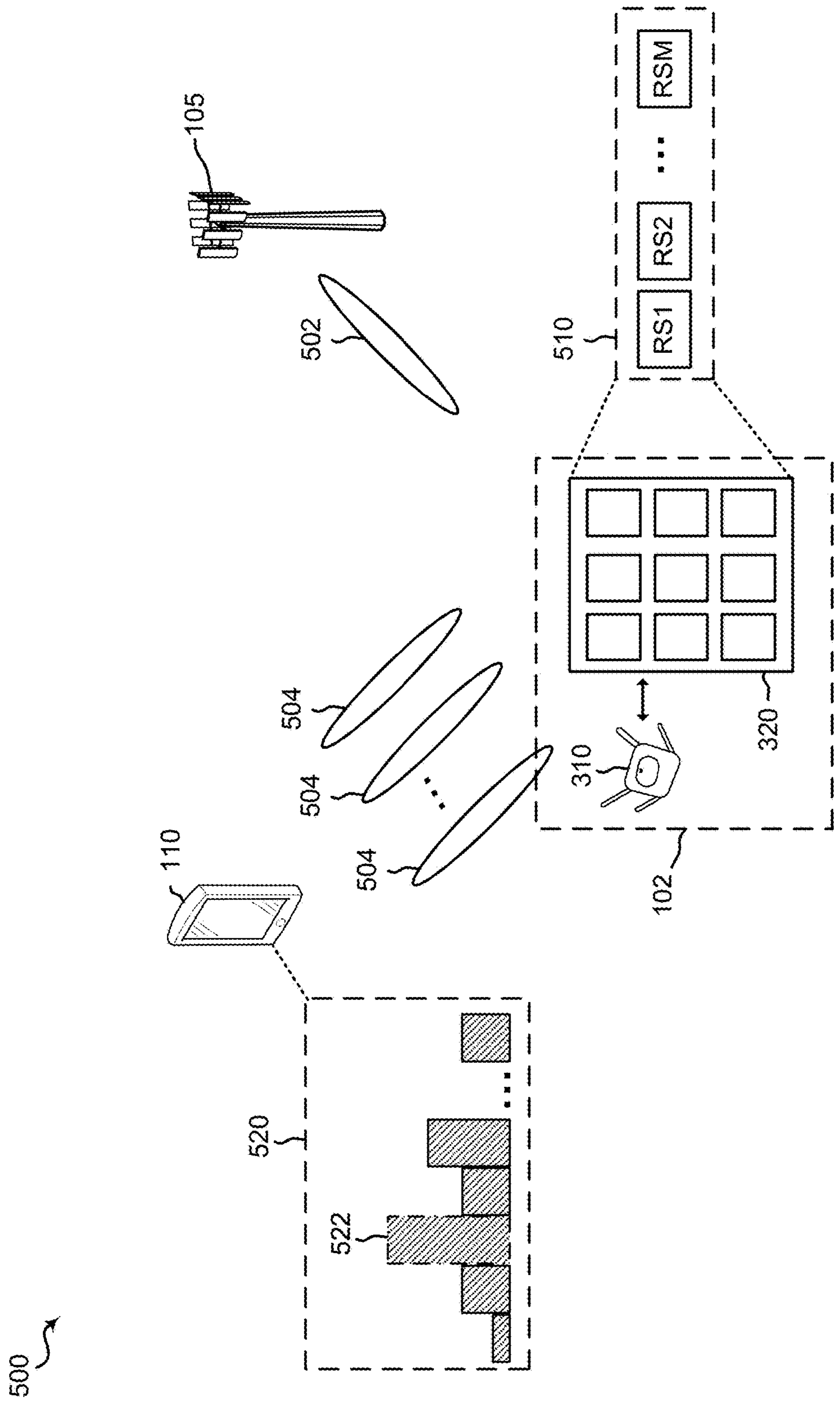
FIG. 5 is a block diagram of another example of wireless communications between the UE and base station via an RIS system, according to aspects of the present disclosure.

Referring to FIG. 5, the first network node 200 may perform reference signal (RS) based precoder selection. For example, the base station 105 in DL (or UE 110 in UL) may sound the RIS 102 system with multiplexed RSs.

In an example, the base station 105 may send a beam 502 to the RIS system 102 for the UE 110. The beam 502 may include an identification of the UE 110 and/or any information for the RIS controller 310 to change weights of the surface 320 so the signal 502 can be reflected to the UE 110. The base station 105 may also perform beam training with the RIS system 102 to adjust the weights, such that element phases may change beam directions over each of the RSs. Further, the RIS controller 310 may use a different (codebook or non-codebook) precoder 510 for each RS occasion. In doing so, reflected beams 504 may have a phase of $\Phi_1$, $\Phi_2, \ldots, \Phi_k$. In response to the reflected beams 504, the UE 110 may measure power levels 520 (e.g., RSRP, RSRQ, or SINR) for each training occasion and select an RS with the highest power level 522, and transmits an RS index for the RS with the highest power level 522. In response to receiving the RS index, the RIS controller 310 and the base station 105 may use the RS index to determine a best precoding operation.

In other examples, the UE 110 may send the beam 502, and the base station 105 may measure power levels 520 and select the highest power level 522.

Figure 6A:
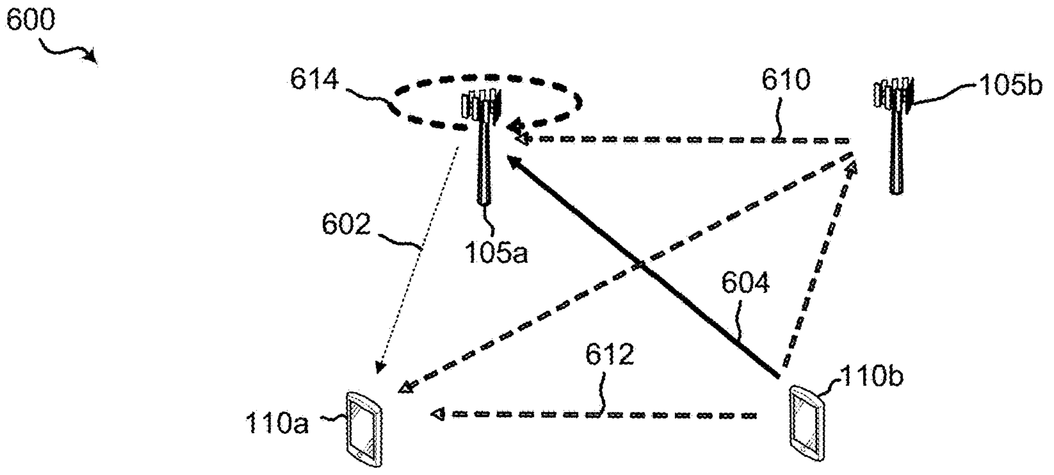
FIG. 6A is a block diagram of a first example of full-duplex communications between the UE and base station of FIG. 1, according to aspects of the present disclosure.
Figure 6B:
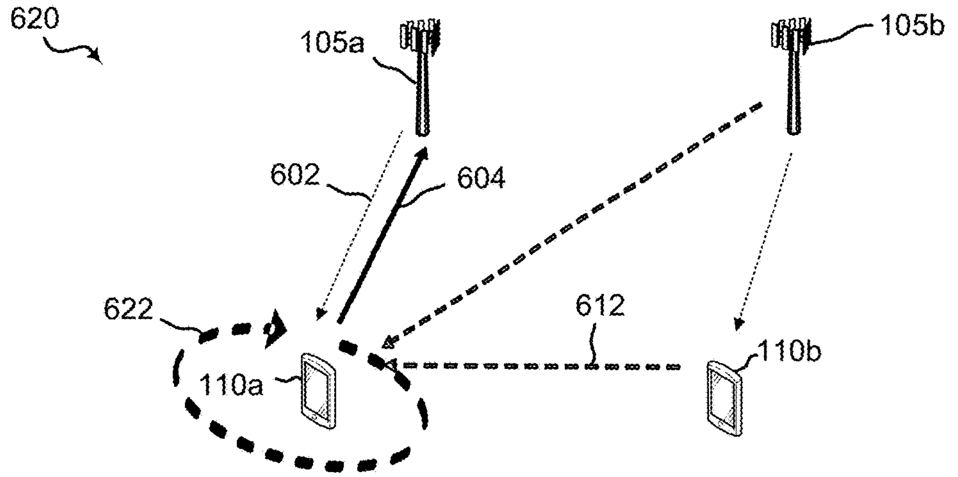
FIG. 6B is a block diagram of a second example of full-duplex communications between the UE and base station of FIG. 1, according to aspects of the present disclosure.
Figure 6C:
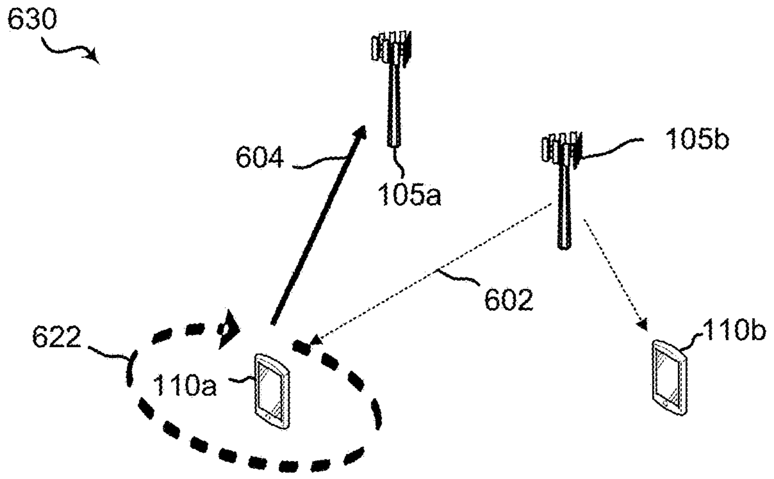
FIG. 6C is a block diagram of a third example of full-duplex communications between the UE and base station of FIG. 1, according to aspects of the present disclosure.

Referring to FIGS. 6A-6C, full-duplex communications may include three different communication modes. FIG. 6A illustrates an example of a first communication mode 600 including a full-duplex base station 105*a* and half-duplex UEs 110*a* and 110*b*. In this example, a first UE 110*a* may receive a DL signal 602 from a first base station 105*a*, and a second UE 110*b* may transmit a UL signal 604 to the first base station 105*a*. Based on these signals different types of interference may occur, including, but not limited to, interference 610 from the second base station 105*b* at the first base station 105*a*, interference 612 from the second UE 110*b* at the first UE 110*a*, and self-inference 614 from the DL signal 602 to the UL signal 604 at the first base station 105*a*.

FIG. 6B illustrates an example of a second communication mode 620 including a full-duplex base station 105*a* and full-duplex UE 110*a*. In this example, the first UE 110*a* may receive the DL signal 602 from the first base station 105*a*, and transmit the UL signal 604 to the first base station 105*a*. Based on these signals, and nearby signals from the second UE 110*b* and the second base station 105*b*, different types of interference may occur, including, but not limited to, the interference 612 from the second UE 110*b* at the first UE 110*a*, and self-inference 622 from the UL signal 604 to the DL signal 602 at the first UE 110*a*.

FIG. 6C illustrates an example of a third communication mode 630 including a full-duplex UE 110*a* but not a full-duplex base station 110*a* or 110*b*. In this example, the first UE 110*a* may transmit the UL signal 604 to the first base station 105*a* and receive the DL signal 602 from the second base station 105*a*. Based on these signals, and nearby signals from the second UE 110*b*, different types of interference may occur, including, but not limited to, self-inference 622 from the UL signal 604 to the DL signal 602 at the first UE 110*a*.

Figure 7A:
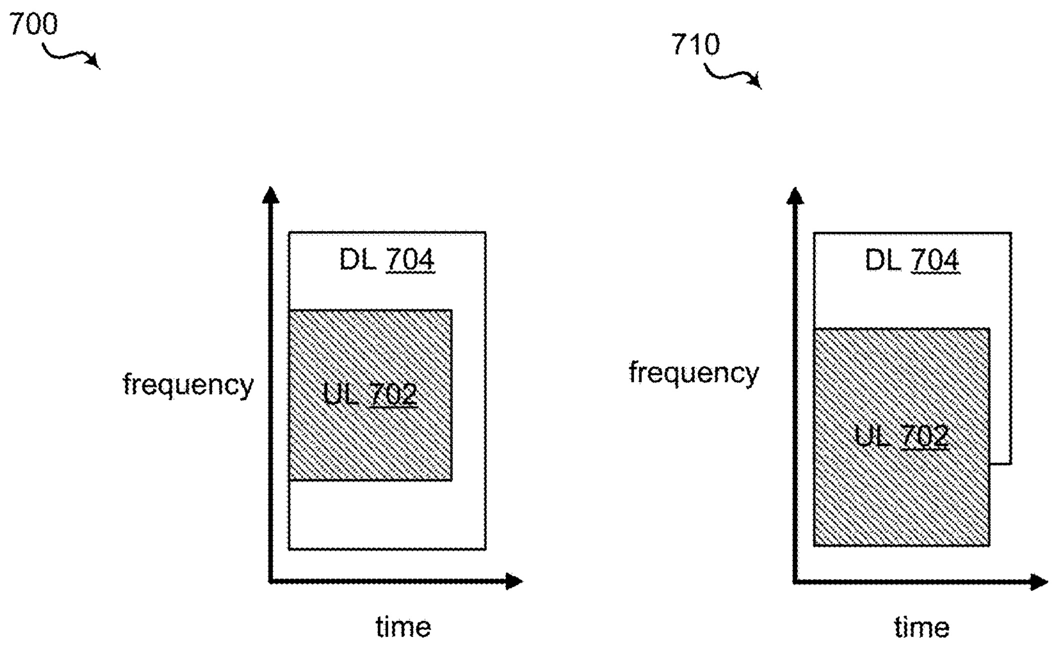
FIG. 7A is a conceptual diagram of a first example of a full-duplex communication scheme, according to aspects of the present disclosure.
Figure 7B:
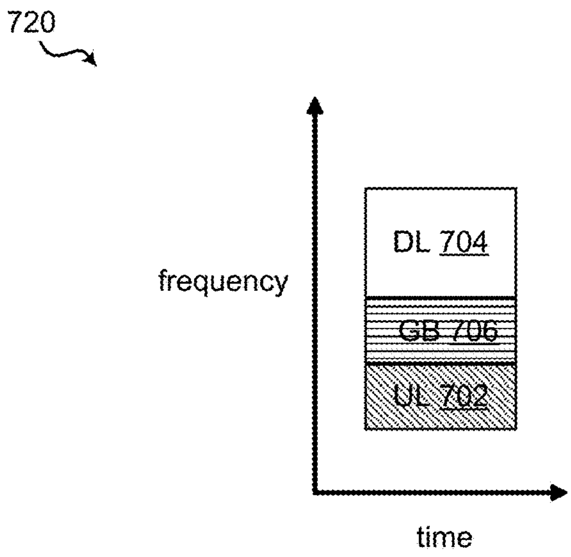
FIG. 7B is a conceptual diagram of a second example of a full-duplex communication scheme, according to aspects of the present disclosure.

Referring to FIG. 7A-7B, there may be two types of full-duplex operations: an in-band full duplex (IBFD) and a sub-band full-duplex. In the in-band full-duplex scheme, as illustrated by FIG. 7A, the UL signal 702 and the DL signal 704 may overlap in time and frequency which may allow the UL signal 702 and the DL signal 704 to transmit and receive on the same time and frequency resource. In an example, the UL signal 702 and the DL signal 704 may share the same IBFD time/frequency resource resulting in, for example, a full overlap in-band scheme 700 or a partial overlap in-band scheme 710.

In a sub-band full-duplex scheme 720 (a.k.a. flexible duplex), as illustrated by FIG. 7B, the UL signal 702 and the DL signal 704 may be transmitted and received at the same time but on different frequency resources. In this scheme, The DL signal 704 resource is separated from UL signal 702 resource in the frequency domain. Further, in order to prevent interference or self-interference, the UL signal 702 and the DL signal 704 separated by a guard band 706.

Figure 8:
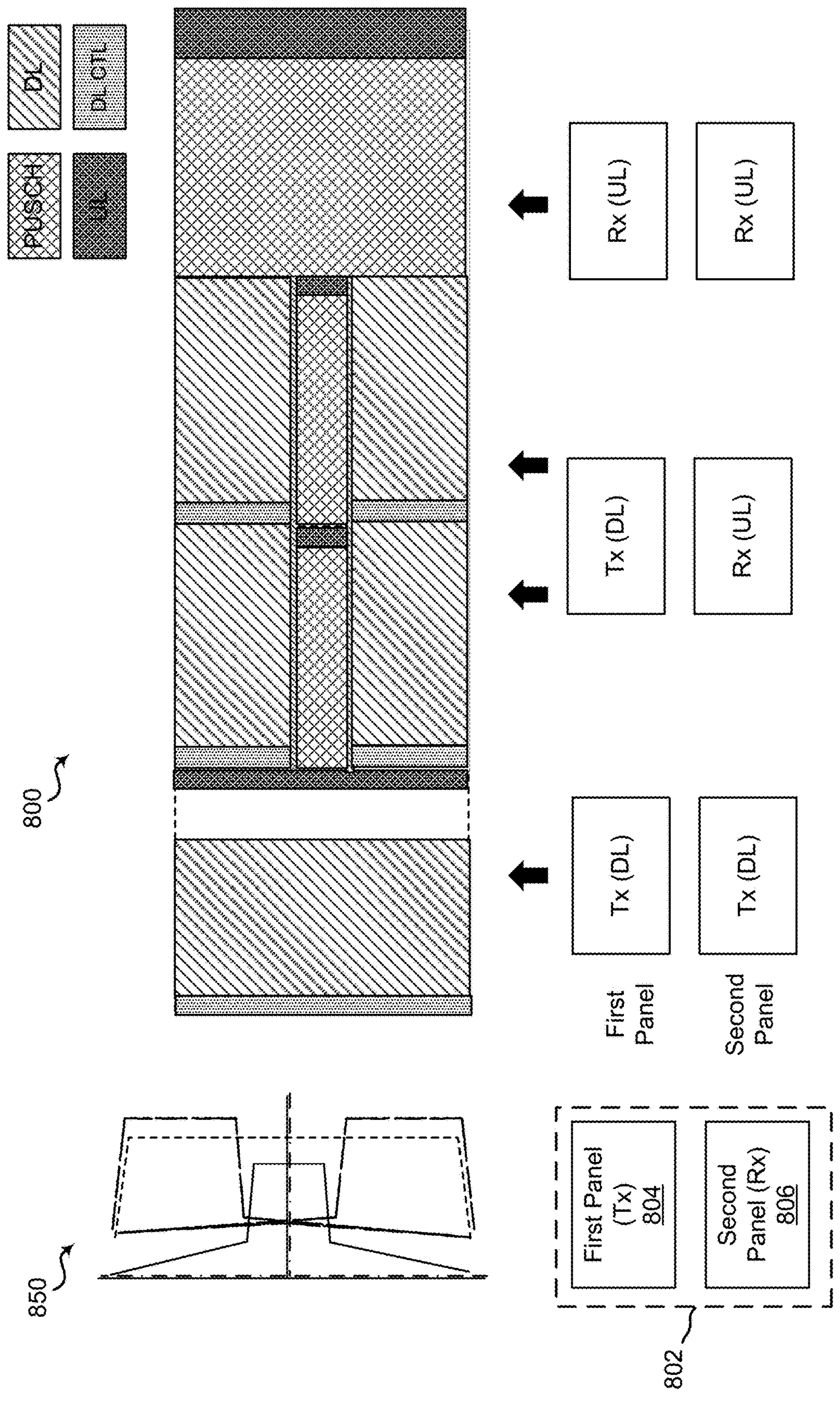
FIG. 8 are additional conceptual diagrams of examples of full-duplex communication schemes, according to aspects of the present disclosure.

Referring to FIG. 8, an example of a full-duplex scheme 800 resulting in the signal 850, is illustrated. In this example, a full duplex device 802 (e.g., base station 105 or UE 110) may incorporate self interference mitigation. In doing so, improved isolation (e.g., >50 dB) may occur based on the full-duplex device 802 incorporating, for example, two separate panels for simultaneous transmission and receiving operations. In an example, a first panel 804 may be for DL transmissions at both edges of a band, and a second panel 806 may be for UL reception at a middle portion of the band.

In an example, for sub-band full-duplex (e.g., >40 dB isolation), a DL signal resource and UL signal resource are in different portions of the band. Further a guard band may be positioned between the UL signal resource and the DL signal resource. In an example, a receiving windowed overlap-and-add (WOLA) processing may be used to reduce adjacent-channel-leakage-ratio (ACLR) leakage to the UL signal. In some examples, an analog low-pass filter (e.g., LPF0) may be used to improve analog-to-digital conversion (ADC) dynamic range, and/or improve receiving analog gain control (AGC) states to improve the (e.g., noise figure).

In an aspect, the full-duplex device 802 may include a digital integrated chip (IC_ of the ACLR leakage (e.g., >20 dB) including a non-linear model per each transmission-receiving pair.

The present disclosure provides techniques to configure the RIS surface 320 and the RIS controller 310 to operate under full-duplex base stations 105 and/or full-duplex UEs 110. In an aspect, if an RIS surface 320 (e.g., RIS surface material) can adjust the element weights per sub-band, then when a full-duplex operation is ongoing, the RIS controller 310 may receive an indication of the full-duplex operation so the RIS controller 310 can update and change element weights of the RIS surface 320 to optimize UL and DL beams separately or jointly based on precoding training techniques.

In another aspect, the present disclosure provides techniques for self-channel (e.g., base station-to-RIS surface or RIS surface to UE) estimation under full-duplex operation. This technique may not be performed under half-duplex operation due to a node (e.g., base station 105 or UE 110) being unable to measure a reflected beam by the RIS surface 320.

In an aspect, the base station 105 or the UE 110 may send an indication of a full-duplex operation to the RIS controller 310. In an example, the base station 105 or the UE 110 may also send an indication of a type of full-duplexity (e.g., in-band or subband) to the RIS controller 310 in order for the RIS controller 310 to know the band for each signal direction (e.g., DL/UL).

In a first example, the RIS surface 320 may be able to change weights based on the frequency band that is used. When there is a UL signal and a DL signal happening at the same time, the RIS controller 310 may receive an indication so that the RIS controller 310 may change the element weights of the RIS surface 320 jointly for UL and DL across the two subbands. In response to the indication, the RIS controller 320 may set element weights for the RIS surface 320 according to the bands (e.g., subbands) being UL or DL.

In a second example, if complete overlap occurs between UL and DL (e.g., in-band full-duplex scheme), then the RIS surface 320 may have the same response to both transmissions, and there may be no way to separate (e.g., the beamformer at RIS system 102 may be the same and cannot be different for UL and DL) the UL from the DL. Accordingly, beam training in this case may help in determining a best beam for both sides (e.g., UL and DL).

In another aspect, the base station 105 or the UE 110 may configure the RIS controller 310 based on one of two options. In a first option, the base station 105 or the UE 110 may configure the RIS controller 310 to change the UL/DL beams jointly (e.g., change both UL and DL beams at the same time) where the base station 105 may send DL RSs at the same time the UE 110 sends UL RSs. Sending the DL and UL RSs at the same time may help the RIS controller 310 to know a self-interference impact at both nodes (e.g., base station 105, UE 110) while doing beam training, so beam selection may be incorporated.

In a second option, the base station 105 or the UE 110 may configure the RIS controller 310 to change the UL/DL beams separately. For example, beam training for each communication direction individually may be performed. In this example, K UL RSs may be used for UL training, where K is any positive integer and K DL RSs may be used for DL training, so in total, we have K DL+K UL RSs separated in time (e.g., time division multiplexed).

In an example, the RIS controller 310 may be beam trained by the base station 110 to obtain DL RIS beams from the base station 105 to serve the UE 110 (e.g., over a DL subband). While performing UL training (e.g., UE 110 to base station 105 through the RIS system 102 over the UL subband), the base station 110 may interfere by sending RSs (e.g., overlapped with the K UL RSs time/frequency) for DL with the RIS system 102 performing on an obtained beam (for DL) on the DL subband. As a result, the first K DL RSs may have no interference from the UE 110 while the second set of training (e.g., UL training with size K UL) may have interference from the base station 105.

In an example, the RIS controller 310 may receive an indication whether an ongoing training is to optimize the base station 105 to a UE DL path or to optimize the UE 105 to a base station UL path or both at the same time, since the set of beams used for training may be different for different nodes. In an example, this may lead to either training jointly UL and DL transmissions or optimizing them individually.

In another aspect, beams may be refined (e.g., beam refinement) under full-duplex operation. For example, after joint or separate training, the base station 105 may configure another training session (or another X training sessions, each with size K, where X is any positive integer) to train the UL given a DL beam (e.g., selected from the DL beam obtained while training DL). In this case, K may equal=K UL2, and train DL given the UL beam (e.g., selected from the UL beam obtained while training UL). In this case, K may equal K DL2, where K UL2 and K DL2 may be sizes of the UL and DL training sessions of the second phase. Beam refinement may be important for sub-band full-duplex cases where the UL may interfere with the DL and/or the DL may interfere with the UL.

Figure 9:
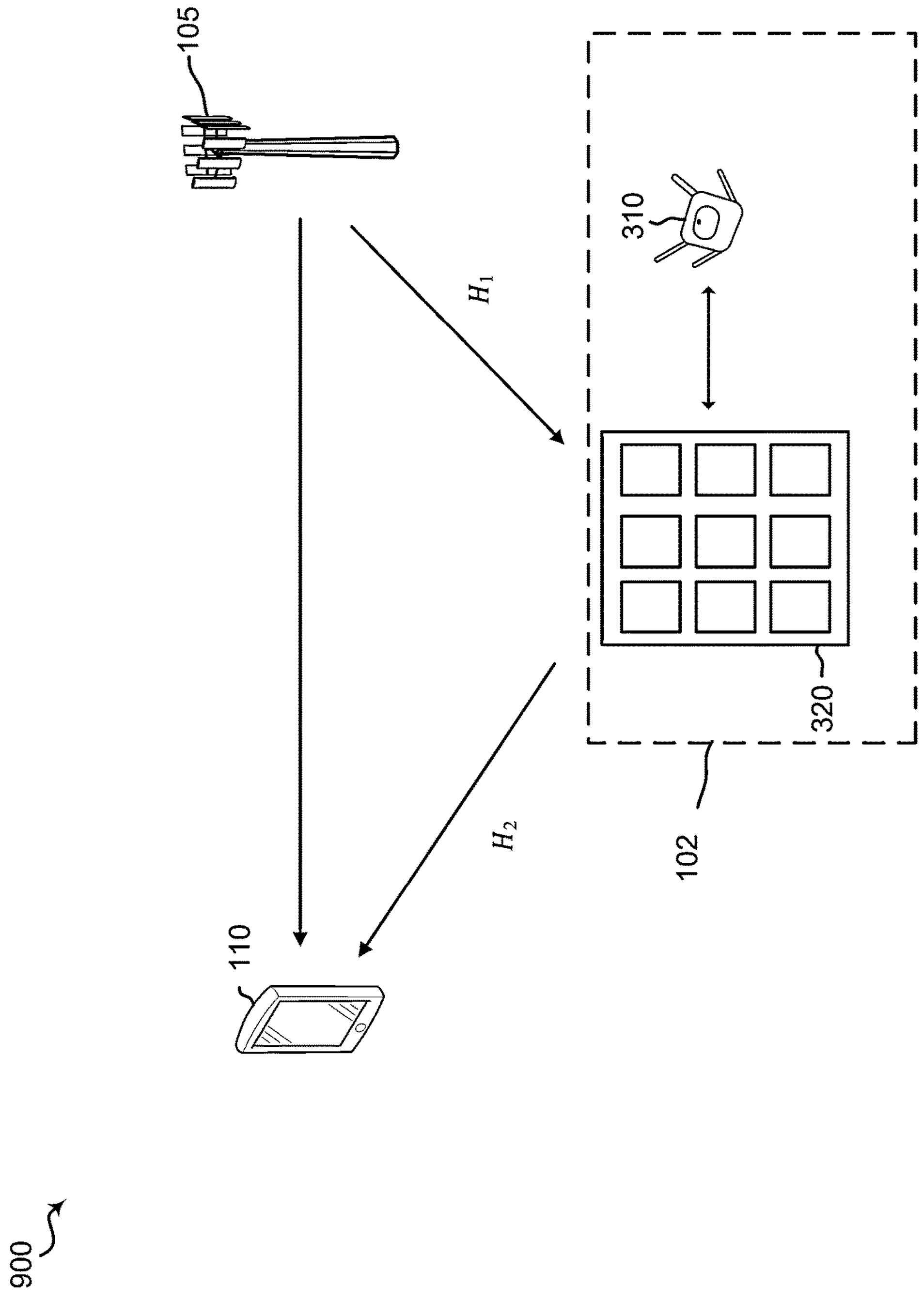
FIG. 9 is another block diagram of an example of wireless communications between the UE and base station via an RIS system, according to aspects of the present disclosure.

In another aspect, self-channel estimation may be performed by the RIS system 102. For example, referring to FIG. 9, the RIS system may use a reconfigurable reflectarray (RACIAN) channel model. In this example, the RIS system 102 may be controlled on or off for base station 105 to UE 110 (BS-UE) and base station 105 to RIS surface 320 to UE 110 (BS-RIS-UE) channel estimations. In this case, overhead reduction may be more important. Cascaded channel estimation may be used such that channel matrices $H_1$ and $H_2$ may not be separable except for scaling purposes only (e.g., depending on channels).

$H_1$ may represent a channel matrix having a size equal to a number of antennas at a transmission side times a number of elements at the RIS surface 320. $H_2$ may represent a channel matrix having a size equal to a number of elements of the RIS surface 320 times a number of antennas at a receiver side. When $$H_2 = H_1^T, \text{ where } H_1^T$$

is the transpose of $H_1$ (on the same node), then the size of the number of elements at the RIS surface times the number of antennas at the receiver side (assuming circulator and inband full duplex where a same set may be used for transmission and receiving at a node). In an example, assuming two transmission antennas at a transmitting device, two elements on an RIS surface, and two receiving antennas at a receiving device, then the size is 2×2 for $H_1$ and $H_2$. Accordingly, $H_1$ may equal $[h_{11}\ h_{12};\ h_{21}\ h_{22}]$ where $h_{ij}$ is an ith transmitting antenna of the transmitting device, and jth element of the RIS surface, and $H_2$ may equal $[g_{11}\ g_{12};\ g_{21}\ g_{22}]$ where $g_{ij}$ is the ith element of the RIS surface and the jth receiving antenna of the receiving device.

For a BS-RIS channel, the RIS system 102 may be quasi-static with no major mobility (e.g., line-of-sight (LoS) dominant). Further, for the BS-RIS channel $H_1$ may be common to all UEs 110. An optimal RIS codebook may be used including $\Phi^H\Phi=\alpha I$ with max $\alpha$ and having a minimum variance estimation for a single UE 110. In this example, channel properties may be exploited to reduce overhead with higher estimation accuracy.

In an aspect, self-channel estimation (e.g., BS-to-RIS or UE-to-RIS) may be requested or indicated for enablement. Once this feature is enabled, a known reflection matrix $\Phi=\Phi_{S\text{-}CE}$ may be used by the RIS controller 310 while training is performed.

The reflection matrix $\Phi=\Phi_{S\text{-}CE}$ may be selected and agreed upon based on a location of the RIS surface 320 and the position of the base station 105 (or UE 110 based on which apparatus is performing the training). In an example, the base station 105 (or the UE 110) may compute the $\Phi_{S\text{-}CE}$ for its channel to RIS, and also for that between the RIS surface 320 and the UE 110 (or the base station 105 if beam training is performed by the UE 110) based on localization of the UE 110 (or base station 105), to be used in case of a full duplex UE 105 trying to estimate its channel to the RIS surface 320.

In an example, $\Phi_{S\text{-}CE}$ may also be obtained through RIS beam-training before or after the base station 105 sends a self-channel estimation request. In beam training, the base station may transmit RSs. In response, the RIS system 102 may try some beams (could be spatially correlated to an initial beam $\Phi_{S\text{-}CE}$ signaled to the base station 110 to the RIS controller 320. The base station 105 may transmit a best beam (RS) index to the RIS controller 310. This beam may be used while performing the self-channel estimation process.

If training will be done after an indication or request, an initial value (based on positions of the base station 105 and the RIS surface 320) may be signaled with the request so that refinement can be done through beam training.

In an example, $\Phi_{S\text{-}CE}$ may be all ones, which may simplify the channel estimation using $$H_1 H_1^T, \text{ where } H_1^T$$

is the transpose of $H_1$, using some eigenvalue decomposition methods but this may be less directive to base station 105 or the receiver channel. Conventionally, a half-duplex base station or half-duplex UE is unable to estimate its channel to the RIS surface 320 or even to predict how good or bad the channel is. This may be due to $H_1$ and $H_2$ not being separable. However, one case that would give an indication of the channel is a full-duplex node (e.g., base station 105 or UE 110) with antennas used for both transmission and receiving at the same time (e.g., simultaneously), i.e., an antenna is connected with a circulator.

In an aspect, channel estimation for a full-duplex node may be performed. For example, a first node (e.g., base station 105) may transmit an RS to the RIS surface 320. The RIS surface 320 may reflect the RS using $\Phi_{S\text{-}CE}$. The first node may receive the reflected signal with interference from its own transmission. At the same time, a second node (e.g., UE 110) may receive the signal and may estimate the BS-RIS-UE channel. Since the first node knows $\Phi_{S\text{-}CE}$, the first node may know its own channel, assuming the RIS surface 320 reflected with a number of elements less than a number of receiving antennas of the first node. With this approach, the base station 105 may estimate $H_1$, cancel out the impact of the reflective matrix (e.g., divide over it), and optimize $H_1$ as needed at its side. Further, the first node may be able to find a better precoder to be direct to the RIS surface 320 or jointly to a serving second node and the RIS surface 320.

Figure 10:
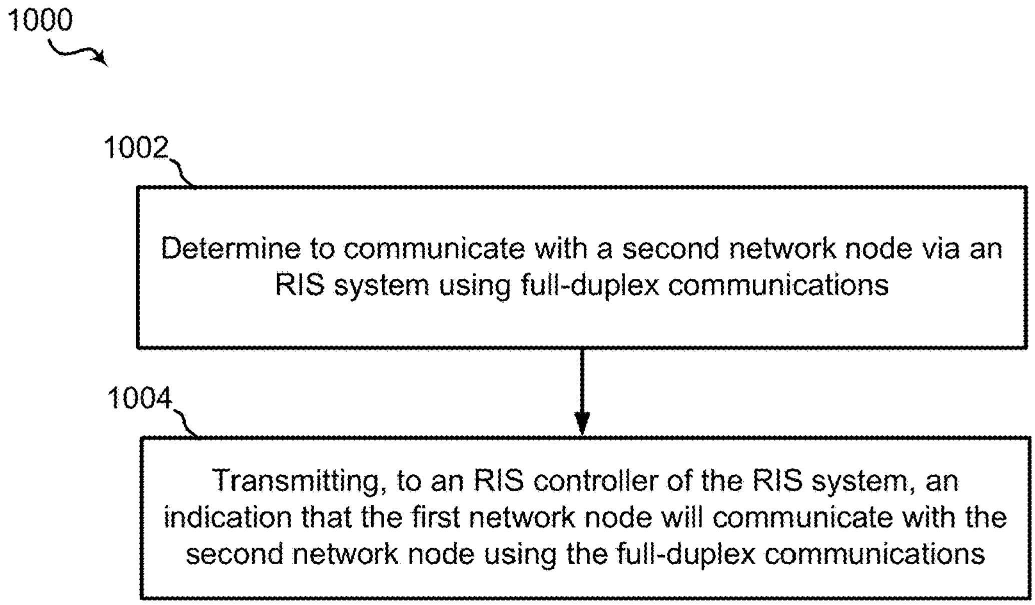
FIG. 10 is flowchart of an example method performed by a first network node (e.g., base station or UE) of FIG. 1, according to aspects of the present disclosure.

Referring to FIG. 10, an example of a method 1000 for wireless communications may be performed by a first network node 200 such as the UE 110 or the base station 105 of the wireless communication network 100. For example, operations of the method 1000 may be performed by the RIS configuration component 142, the modem 140, the transceiver 202, the processor 212, the memory 216, and or any other component/subcomponent of the UE 110 or the base station 105.

At block 1002, the method 1000 may include determining to communicate with a second network node via an RIS system using full-duplex communications. For example, the RIS configuration component 142, the modem 140, the transceiver 202, the processor 212, and/or the memory 216 of the first network node 200, and/or one or more additional components/subcomponents of the first network node 200 may be configured to or may comprise means for determining to communicate with a second network node via an RIS system using full-duplex communications.

For example, the determining to communicate using full-duplex communications at block 1002 may include determining by the RIS configuration component 142, the modem 140, the transceiver 202, the processor 212, and/or the memory 216 of the first network node 200, to communicate with a second network node (e.g., UE 110 or base station 105) due to a blockage 420 of FIG. 4 or to extend signal range via the RIS system 102 using full-duplex communications because the first network node and the second network node are capable of full-duplex communications.

At block 1004, the method 1000 may include transmitting, to an RIS controller of the RIS system, an indication that the first network node will communicate with the second network node using the full-duplex communications. For example, the RIS configuration component 142, the modem 140, the transceiver 202, the processor 212, and/or the memory 216 of the first network node 200, and/or one or more additional components/subcomponents of the first network node 200 may be configured to or may comprise means for transmitting, to an RIS controller of the RIS system, an indication that the first network node will communicate with the second network node using the full-duplex communications.

For example, the transmitting the indication at block 1004 may include transmitting by the RIS configuration component 142, the modem 140, the transceiver 202, the processor 212, and/or the memory 216 of the first network node 200, to the RIS controller 310 of the RIS system 102, an indication that the first network node 200 (e.g., base station 105 of FIG. 4) will communicate with the second network node (e.g., UE 110 of FIG. 4) using the full-duplex communications.

In an aspect, the method 1000 may also include transmitting, to the RIS controller, a second indication indicating the full-duplex communications are one of in-band full-duplex communications or subband full-duplex communications. For example, the RIS configuration component 142, the modem 140, the transceiver 202, the processor 212, and/or the memory 216 of the UE 110, and/or one or more additional components/subcomponents of the first network node 200 may be configured to or may comprise means for transmitting, to the RIS controller, a second indication indicating the full-duplex communications are one of in-band full-duplex communications or subband full-duplex communications.

For example, the transmitting the second indication may include transmitting by the RIS configuration component 142, the modem 140, the transceiver 202, the processor 212, and/or the memory 216 of the first network node 200, to the RIS controller 310 of FIG. 4, a second indication indicating the full-duplex communications are one of in-band full-duplex communications or subband full-duplex communications.

In an aspect, the method 1000 may also include performing beam training with the RIS system to configure UL beams and DL beams jointly. For example, the RIS configuration component 142, the modem 140, the transceiver 202, the processor 212, and/or the memory 216 of the first network node 200, and/or one or more additional components/subcomponents of the first network node 200 may be configured to or may comprise means for performing beam training with the RIS system to configure UL beams and DL beams jointly.

For example, the performing the beam training may include performing by the RIS configuration component 142, the modem 140, the transceiver 202, the processor 212, and/or the memory 216 of the first network node 200 performing beam training with the RIS system 102 to configure UL beams and DL beams jointly.

In an example, the UL beams and DL beams may be configured jointly by the RIS configuration component 142, the modem 140, the transceiver 202, the processor 212, and/or the memory 216 of the first network node 200 transmitting, to the RIS system 102, the first RSs at the same time as the second network node (base station 105 or UE 110) transmits second RSs to the RIS system 102, wherein the first RSs are one of UL RSs or DL RSs and the second RSs are opposite RSs as the first RSs.

In an aspect, the method 1000 may also include performing beam training with the RIS system to configure UL beams and DL beams separately. For example, the RIS configuration component 142, the modem 140, the transceiver 202, the processor 212, and/or the memory 216 of the first network node 200, and/or one or more additional components/subcomponents of the first network node 200 may be configured to or may comprise means for performing beam training with the RIS system to configure UL beams and DL beams separately.

For example, the performing the beam training may include performing by the RIS configuration component 142, the modem 140, the transceiver 202, the processor 212, and/or the memory 216 of the first network node 200 beam training with the RIS system 102 to configure UL beams and DL beams separately.

In an example, the beam training may configure the UL and DL beams separately by the RIS configuration component 142, the modem 140, the transceiver 202, the processor 212, and/or the memory 216 of the first network node 200 implementing a number of UL RSs equal to a number of DL RSs.

In an aspect, the method 1000 may also include performing beam training with the RIS system to configure UL beams and DL beams jointly or separately, and refining a configuration of a UL beam of the UL beams based on a DL beam of the DL beams or the DL beam based on the UL beam. For example, the RIS configuration component 142, the modem 140, the transceiver 202, the processor 212, and/or the memory 216 of the first network node 200, and/or one or more additional components/subcomponents of the first network node 200 may be configured to or may comprise means for performing beam training with the RIS system to configure UL beams and DL beams jointly or separately, and refining a configuration of a UL beam of the UL beams based on a DL beam of the DL beams or the DL beam based on the UL beam.

For example, the performing the beam training may include refining by the RIS configuration component 142, the modem 140, the transceiver 202, the processor 212, and/or the memory 216 of the first network node 200 refining a configuration of a UL beam of the UL beams based on a DL beam of the DL beams or the DL beam based on the UL beam.

In an aspect, the method 1000 may also include transmitting, to the RIS controller, a request for a self-channel estimation. For example, the RIS configuration component 142, the modem 140, the transceiver 202, the processor 212, and/or the memory 216 of the UE 110, and/or one or more additional components/subcomponents of the first network node 200 may be configured to or may comprise means for transmitting, to the RIS controller, a request for a self-channel estimation.

For example, the transmitting a request may include transmitting by the RIS configuration component 142, the modem 140, the transceiver 202, the processor 212, and/or the memory 216 of the first network node 200, to the RIS controller 310, a request for a self-channel estimation.

In an example, the self-channel estimation may be based on a positioning of the first network node and a location of an RIS surface 320 of the RIS system 102.

In an aspect, the method 1000 may also include transmitting, to the RIS system, an RS, receiving, from the RIS system, a reflection matrix in response to the RS being reflected by the RIS system, and configuring a channel based on the reflection matrix. For example, the RIS configuration component 142, the modem 140, the transceiver 202, the processor 212, and/or the memory 216 of the first network node 200, and/or one or more additional components/subcomponents of the first network node 200 may be configured to or may comprise means for transmitting, to the RIS system, an RS, receiving, from the RIS system, a reflection matrix in response to the RS being reflected by the RIS system, and configuring a channel based on the reflection matrix.

For example, the transmitting, receiving, and configuring may be performed by the RIS configuration component 142, the modem 140, the transceiver 202, the processor 212, and/or the memory 216 of the first network node 200 transmitting, to the RIS system 102, an RS, receiving, from the RIS system 102, a reflection matrix in response to the RS being reflected by the RIS system, and configuring a channel based on the reflection matrix.

Figure 11:
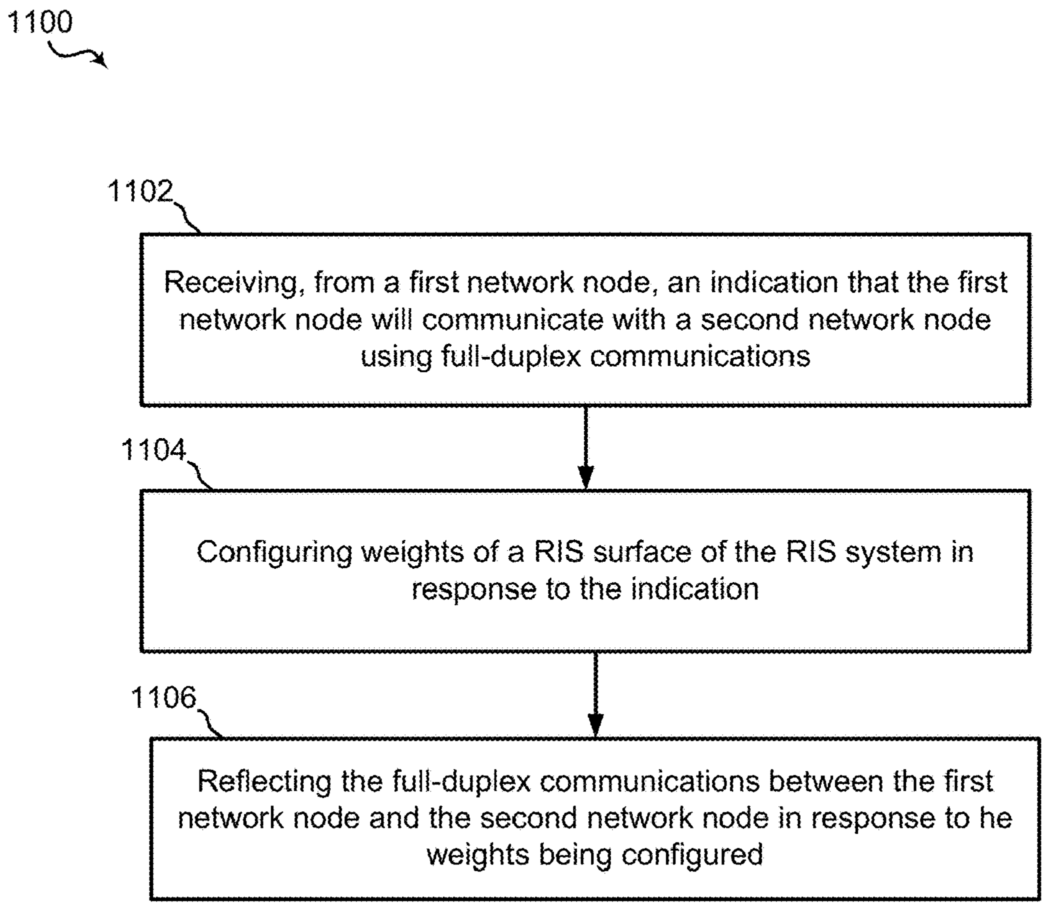
FIG. 11 is flowchart of another example method performed by an RIS controller, according to aspects of the present disclosure.

Referring to FIG. 11, an example of a method 1100 for wireless communications may be performed by the RIS system 102 of the wireless communication network 100. For example, operations of the method 1100 may be performed by the processor 312 and/or the memory 316 of the RIS controller 310 and/or the RIS surface 320 of FIG. 3 and/or one or more additional components/subcomponents of the RIS controller 310 and/or the RIS surface 320.

At block 1102, the method 1100 may include receiving, from a first network node, an indication that the first network node will communicate with a second network node using full-duplex communications. For example, the processor 312 and/or the memory 316 of the RIS controller 310 may be configured to or may comprise means for receiving, from a first network node, an indication that the first network node will communicate with a second network node using full-duplex communications.

For example, the receiving the indication by the RIS controller 310 at block 1102 may include receiving, the processor 312 and/or the memory 316 of the RIS controller 310, from the base station 105 of FIG. 4, an indication that the base station 105 will communicate with the UE 110 of FIG. 4 using full-duplex communications. However, in other examples, the indication from a UE 110 may be received and the indication may indicate that the UE 110 will communicate with the base station 105 or another UE 110. In an example, the indication may be received in one or more of a radio resource control (RRC) message, a medium access control-control element (MAC-CE) message, or a DL control information (DCI) message.

At block 1104, the method 1100 may include configuring weights of an RIS surface of the RIS system in response to the indication. For example, the processor 312 and/or the memory 316 of the RIS controller 310 may be configured to or may comprise means for configuring weights of a RIS surface of the RIS system in response to the indication.

For example, the configuring the weights by the RIS controller 310 at block 1104 may include configuring, by the processor 312 and/or the memory 316 of the RIS controller 310, weights of the RIS surface 320 of the RIS system 102 in response to the indication.

At block 1106, the method 1100 may include reflecting the full-duplex communications between the first network node and the second network node in response to the weights being configured. For example, the processor 312 and/or the memory 316 of the RIS controller 310 and/or the RIS surface 320 may be configured to or may comprise means for reflecting the full-duplex communications between the first network node and the second network node in response to the weights being configured.

For example, the reflecting the communications by the RIS controller at block 1106 may include reflecting, by the processor 312 and/or the memory 316 of the RIS controller 310 and/or the RIS surface 320, the full-duplex communications between the base station 105 and the UE 110 of FIG. 4 in response to the weights being configured.

In an example, the method 1100 may also include receiving, from the first network node, a second indication indicating the full-duplex communications are one of in-band full-duplex communications or subband full-duplex communications, and configuring the weights further in response to the second indication. For example, the processor 312 and/or the memory 316 of the RIS controller 310 may be configured to or may comprise means for receiving, from the first network node, a second indication indicating the full-duplex communications are one of in-band full-duplex communications or subband full-duplex communications, and configuring the weights further in response to the second indication.

For example, the receiving and configuring by the RIS controller 310 may include the processor 312 and/or the memory 316 of the RIS controller 310 receiving, from the base station 105 of FIG. 4, a second indication indicating the full-duplex communications are one of in-band full-duplex communications or subband full-duplex communications, and configuring the weights further in response to the second indication.

In an example, the method 1100 may also include performing beam training with the first network node to configure UL beams and DL beams jointly, and configuring the weights further in response to the performing the beam training. For example, the processor 312 and/or the memory 316 of the RIS controller 310 may be configured to or may comprise means for performing beam training with the first network node to configure UL beams and DL beams jointly, and configuring the weights further in response to the performing the beam training.

For example, the performing and configuring by the RIS controller 310 may include the processor 312 and/or the memory 316 of the RIS controller 310 performing beam training with the base station 105 of FIG. 4 to configure UL beams and DL beams jointly, and configuring the weights further in response to the performing the beam training.

In an example, the method 1100 may also include receiving, from the first network node, first RSs, receiving, from the second network node, second RSs at a same time as the first RSs, wherein the first RSs are one of UL RSs or DL RSs and the second RSs are opposite RSs as the first RSs, and configuring the weights further in response to receiving the first RSs and second RSs. For example, the processor 312 and/or the memory 316 of the RIS controller 310 may be configured to or may comprise means for receiving, from the first network node, first RSs, receiving, from the second network node, second RSs at a same time as the first RSs, wherein the first RSs are one of UL RSs or DL RSs and the second RSs are opposite RSs as the first RSs, and configuring the weights further in response to receiving the first RSs and second RSs.

For example, the receiving and configuring by the RIS controller 310 may include the processor 312 and/or the memory 316 of the RIS controller 310 receiving, from the base station 105, first RSs, receiving, from the UE 110, second RSs at a same time as the first RSs, wherein the first RSs are one of UL RSs or DL RSs and the second RSs are opposite RSs as the first RSs, and configuring the weights further in response to receiving the first RSs and second RSs.

In an example, the method 1100 may also include performing beam training with the first network node to configure UL beams and DL beams separately, and configuring the weights further in response to the performing the beam training. For example, the RIS controller 310 may be configured to or may comprise means for performing beam training with the first network node to configure UL beams and DL beams separately, and configuring the weights further in response to the performing the beam training.

For example, the performing and configuring by the RIS controller may include the processor 312 and/or the memory 316 of the RIS controller 310 performing beam training with the base station 105 to configure UL beams and DL beams separately, and configuring the weights further in response to the performing the beam training.

In some examples, when performing the beam training the RIS controller 310 may receive a number of UL RSs equal to a number of DL RSs.

In an example, the method 1100 may also include performing beam training with the first network node to configure UL beams and DL beams jointly or separately, and refining a configuration of a UL beam of the UL beams based on a DL beam of the DL beams or the DL beam based on the UL beam. For example, the RIS controller may be configured to or may comprise means for performing beam training with the first network node to configure UL beams and DL beams jointly or separately, and refining a configuration of a UL beam of the UL beams based on a DL beam of the DL beams or the DL beam based on the UL beam.

For example, the performing and refining by the RIS controller 310 may include the processor 312 and/or the memory 316 of the RIS controller 310 performing beam training with the base station 105 to configure UL beams and DL beams jointly or separately, and refining a configuration of a UL beam of the UL beams based on a DL beam of the DL beams or the DL beam based on the UL beam.

In an example, the method 1100 may also include receiving, from the first network node, a request for a self-channel estimation, and transmitting, to the first network node, a reflection matrix in response to the request. For example, the RIS controller 310 may be configured to or may comprise means for performing beam training with the first network node to configure UL beams and DL beams jointly or separately, and refining a configuration of a UL beam of the UL beams based on a DL beam of the DL beams or the DL beam based on the UL beam.

For example, the receiving and transmitting by the RIS controller 310 may include the processor 312 and/or the memory 316 of the RIS controller 310 receiving, from the base station 105, a request for a self-channel estimation, and transmitting, to the base station 105, a reflection matrix in response to the request.

In some examples, the self-channel estimation may be based on a positioning of the first network node and a location of an RIS surface of the RIS system.

In an example, the method 1100 may also include receiving, from the first network node, a RS, and transmitting, to the first network node, the reflection matrix in response to the RS being reflected by the RIS surface of the RIS system. For example, the RIS controller 310 may be configured to or may comprise means for receiving, from the first network node, a RS, and transmitting, to the first network node, the reflection matrix in response to the RS being reflected by the RIS surface of the RIS system.

For example, the receiving and transmitting by the RIS controller 310 may include the processor 312 and/or the memory 316 of the RIS controller 310 receiving, from the base station 105, a RS, and transmitting, to the base station 105, the reflection matrix in response to the RS being reflected by the RIS surface of the RIS system.

While examples disclosed herein describe the first network node as the base station 105 and the second network node as the UE 110, aspects of this disclosure are not limited to these examples. Instead, a person of ordinary skill in the art would understand that in other examples or implementations the first network node may be a first base station 105 or a first UE 110 and the second network node may be a second base station 105 or a second UE 110.

Additional Implementations

An example method of wireless communication for a first network node, comprising: determining to communicate with a second network node via an RIS system using full-duplex communications; and transmitting, to an RIS controller of the RIS system, an indication that the first network node will communicate with the second network node using the full-duplex communications.

The above-example method, further comprising: transmitting, to the RIS controller, a second indication indicating the full-duplex communications are one of in-band full-duplex communications or subband full-duplex communications.

One or more of the above-example methods, further comprising: performing beam training with the RIS system to configure UL beams and DL beams jointly.

One or more of the above-example methods, wherein performing the beam training comprises: transmitting, to the RIS system, first RSs at the same time as the second network node transmits second RSs to the RIS system, wherein the first RSs are one of UL RSs or DL RSs and the second RSs are opposite RSs as the first RSs.

One or more of the above-example methods, further comprising: performing beam training with the RIS system to configure UL beams and DL beams separately.

One or more of the above-example methods, wherein performing the beam training comprises: implementing a number of UL RSs equal to a number of DL RSs to perform beam training.

One or more of the above-example methods, further comprising: performing beam training with the RIS system to configure UL beams and DL beams jointly or separately; and refining a configuration of a UL beam of the UL beams based on a DL beam of the DL beams or the DL beam based on the UL beam.

One or more of the above-example methods, further comprising: transmitting, to the RIS controller, a request for a self-channel estimation.

One or more of the above-example methods, wherein the self-channel estimation is based on a positioning of the first network node and a location of an RIS surface of the RIS system.

One or more of the above-example methods, further comprising: transmitting, to the RIS system, an RS; receiving, from the RIS system, a reflection matrix in response to the RS being reflected by the RIS system; and configuring a channel based on the reflection matrix.

An example first network node, comprising: a memory storing instructions; and one or more processors coupled with the memory and configured to: determine to communicate with a second network node via an RIS system using full-duplex communications; and transmit, to an RIS controller of the RIS system, an indication that the first network node will communicate with the second network node using the full-duplex communications.

The above-example first network node, wherein the one or more processors is further configured to: transmit, to the RIS controller, a second indication indicating the full-duplex communications are one of in-band full-duplex communications or subband full-duplex communications.

One or more of the above-example first network nodes, wherein the one or more processors is further configured to: perform beam training with the RIS system to configure UL beams and DL beams jointly.

One or more of the above-example first network nodes, wherein the one or more processors is further configured to: transmit, to the RIS system, first RSs at the same time as the second network node transmits second RSs to the RIS system, wherein the first RSs are one of UL RSs or DL RSs and the second RSs are opposite RSs as the first RSs.

One or more of the above-example first network nodes, wherein the one or more processors is further configured to: perform beam training with the RIS system to configure UL beams and DL beams separately.

One or more of the above-example first network nodes, wherein the one or more processors is further configured to: implement a number of UL RSs equal to a number of DL RSs to perform beam training.

One or more of the above-example first network nodes, wherein the one or more processors is further configured to: perform beam training with the RIS system to configure UL beams and DL beams jointly or separately; and refining a configuration of a UL beam of the UL beams based on a DL beam of the DL beams or the DL beam based on the UL beam.

One or more of the above-example first network nodes, wherein the one or more processors is further configured to: transmit, to the RIS controller, a request for a self-channel estimation.

One or more of the above-example first network nodes, wherein the self-channel estimation is based on a positioning of the first network node and a location of an RIS surface of the RIS system.

One or more of the above-example first network nodes, wherein the one or more processors is further configured to: transmit, to the RIS system, an RS; receive, from the RIS system, a reflection matrix in response to the RS being reflected by the RIS system; and configuring a channel based on the reflection matrix.

An example computer-readable medium storing code to be executed by one or more processors of a first network node, comprising code to perform one or more of the above-example methods.

An example first network node, comprising: means for performing one or more of the above-example methods.

An second example method of wireless communication for an RIS system, comprising: receiving, from a first network node, an indication that the first network node will communicate with a second network node using full-duplex communications; configuring weights of an RIS surface of the RIS system in response to the indication; and reflecting the full-duplex communications between the first network node and the second network node in response to the weights being configured.

The above-second example method, further comprising: receiving, from the first network node, a second indication indicating the full-duplex communications are one of in-band full-duplex communications or subband full-duplex communications; and configuring the weights further in response to the second indication.

One or more of the above-second example methods, further comprising: performing beam training with the first network node to configure UL beams and DL beams jointly; and configuring the weights further in response to the performing the beam training.

One or more of the above-second example methods, wherein performing the beam training comprises: receiving, from the first network node, first RSs; receiving, from the second network node, second RSs at a same time as the first RSs, wherein the first RSs are one of UL RSs or DL RSs and the second RSs are opposite RSs as the first RSs; and configuring the weights further in response to receiving the first RSs and second RSs.

One or more of the above-second example methods, further comprising: performing beam training with the first network node to configure UL beams and DL beams separately; and configuring the weights further in response to the performing the beam training.

One or more of the above-second example methods, wherein performing the beam training comprises: receiving a number of UL RSs equal to a number of DL RSs.

One or more of the above-second example methods, further comprising: performing beam training with the first network node to configure UL beams and DL beams jointly or separately; and refining a configuration of a UL beam of the UL beams based on a DL beam of the DL beams or the DL beam based on the UL beam.

One or more of the above-second example methods, further comprising: receiving, from the first network node, a request for a self-channel estimation; and transmitting, to the first network node, a reflection matrix in response to the request.

One or more of the above-second example methods, wherein the self-channel estimation is based on a positioning of the first network node and a location of an RIS surface of the RIS system.

One or more of the above-second example methods, further comprising: receiving, from the first network node, an RS; transmitting, to the first network node, the reflection matrix in response to the RS being reflected by the RIS surface of the RIS system.

An example RIS system, comprising: a memory storing instructions; and one or more processors coupled with the memory and configured to: receive, from a first network node, an indication that the first network node will communicate with a second network node using full-duplex communications; configure weights of an RIS surface of the RIS system in response to the indication; and reflect the full-duplex communications between the first network node and the second network node in response to the weights being configured.

The above example RIS system, wherein the one or more processors is further configured to: receive, from the first network node, a second indication indicating the full-duplex communications are one of in-band full-duplex communications or subband full-duplex communications; and configure the weights further in response to the second indication.

One or more of the above-example RIS system, wherein the one or more processors is further configured to: perform beam training with the first network node to configure UL beams and DL beams jointly; and configure the weights further in response to the performing the beam training.

One or more of the above-example RIS system, wherein the one or more processors is further configured to: receive, from the first network node, first RSs; receive, from the second network node, second RSs at a same time as the first RSs, wherein the first RSs are one of UL RSs or DL RSs and the second RSs are opposite RSs as the first RSs; and configuring the weights further in response to receiving the first RSs and second RSs.

One or more of the above-example RIS system, wherein the one or more processors is further configured to: perform beam training with the first network node to configure UL beams and DL beams separately; and configure the weights further in response to the performing the beam training.

One or more of the above-example RIS system, wherein the one or more processors is further configured to: receive a number of UL RSs equal to a number of DL RSs.

One or more of the above-example RIS system, wherein the one or more processors is further configured to: perform beam training with the first network node to configure UL beams and DL beams jointly or separately; and refine a configuration of a UL beam of the UL beams based on a DL beam of the DL beams or the DL beam based on the UL beam.

One or more of the above-example RIS system, wherein the one or more processors is further configured to: receive, from the first network node, a request for a self-channel estimation; and transmit, to the first network node, a reflection matrix in response to the request.

One or more of the above-example RIS system, wherein the self-channel estimation is based on a positioning of the first network node and a location of an RIS surface of the RIS system.

One or more of the above-example RIS system, wherein the one or more processors is further configured to: receive, from the first network node, an RS; transmit, to the first network node, the reflection matrix in response to the RS being reflected by the RIS surface of the RIS system.

A second example computer-readable medium storing code to be executed by one or more processors of an RIS system, comprising code to perform one or more of the above-second example methods.

A second example RIS system, comprising: means for performing one or more of the above-second example methods.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication for a base station, comprising:

determining to communicate with a user equipment (UE) via a reconfigurable intelligent surface (RIS) system using full-duplex communications; and transmitting, to an RIS controller of the RIS system, an indication that the base station will communicate with the UE using the full-duplex communications, wherein the full-duplex communications comprise two frequency bands at a same time: a first frequency band for uplink (UL) and a second frequency band for downlink (DL), wherein element weights of the RIS system are changed per frequency band for both the uplink (UL) and the downlink (DL) across the two frequency bands associated with the full-duplex communication based on the indication.

2. The method of claim 1, further comprising: transmitting, to the RIS controller, a second indication indicating the full-duplex communications are one of in-band full-duplex communications or subband full-duplex communications.

3. The method of claim 1, further comprising: performing beam training with the RIS system to configure uplink (UL) beams and downlink (DL) beams jointly.

4. The method of claim 3, wherein performing the beam training comprises: transmitting, to the RIS system, first reference signals (RSS) at the same time as the UE transmits second RSs to the RIS system, wherein the first RSs are one of UL RSs or DL RSs and the second RSs are opposite RSs as the first RSs.

5. The method of claim 1, further comprising: performing beam training with the RIS system to configure uplink (UL) beams and downlink (DL) beams separately.

6. The method of claim 5, wherein performing the beam training comprises: implementing a number of UL reference signals (RSs) equal to a number of DL RSs to perform the beam training.

7. The method of claim 1, further comprising: performing beam training with the RIS system to configure uplink (UL) beams and downlink (DL) beams jointly or separately; and refining a configuration of a UL beam of the UL beams based on a DL beam of the DL beams, or the DL beam based on the UL beam.

8. The method of claim 1, further comprising: transmitting, to the RIS controller, a request for a self-channel estimation.

9. The method of claim 8, wherein the self-channel estimation is based on a positioning of the base station and a location of an RIS surface of the RIS system.

10. The method of claim 8, further comprising:

transmitting, to the RIS system, a reference signal (RS);

receiving, from the RIS system, a reflected signal in response to the RS being reflected by the RIS system with a known reflection matrix;

estimating a channel matrix representing channel between the base station and the RIS system based on the reflected signal, wherein impact of the known reflection matrix is canceled by division operation; and configuring a channel based on the reflection matrix.

11. A base station, comprising:

memory storing instructions; and one or more processors coupled with the memory and configured to:

determine to communicate with a user equipment (UE) via a reconfigurable intelligent surface (RIS) system using full-duplex communications; and transmit, to an RIS controller of the RIS system, an indication that the base station will communicate with the UE using the full-duplex communications, wherein the full-duplex communications comprise two frequency bands at a same time: a first frequency band for uplink (UL) and a second frequency band for downlink (DL), wherein element weights of the RIS system are changed per frequency band for both the uplink (UL) and the downlink (DL) across the two frequency bands associated with the full-duplex communication based on the indication.

12. The base station of claim 11, wherein the one or more processors is further configured to: transmit, to the RIS controller, a second indication indicating the full-duplex communications are one of in-band full-duplex communications or subband full-duplex communications.

13. The base station of claim 11, wherein the one or more processors is further configured to: perform beam training with the RIS system to configure uplink (UL) beams and downlink (DL) beams jointly.

14. The base station of claim 11, wherein the one or more processors is further configured to: perform beam training with the RIS system to configure uplink (UL) beams and downlink (DL) beams separately.

15. The base station of claim 11, wherein the one or more processors is further configured to: transmit, to the RIS controller, a request for a self-channel estimation.

* * * * *